Feb. 15, 1966 T. STOLESEN ET AL 3,234,978
APPARATUS FOR TEXTURING BUILDING PANELS
Filed July 25, 1962 9 Sheets-Sheet 1

INVENTOR.
TRYGVE STOLESEN
ROLF STOLESEN
EDWARD STOLESEN
BY
Leon F. Herbert
ATTORNEY

INVENTORS
TRYGVE STOLESEN
ROLF STOLESEN
EDWARD STOLESEN
BY
Leon F. Herbert
ATTORNEY Feb. 15, 1966 T. STOLESEN ET AL 3,234,978
APPARATUS FOR TEXTURING BUILDING PANELS
Filed July 25, 1962 9 Sheets-Sheet 6

INVENTOR.
TRYGVE STOLESEN
ROLF STOLESEN
EDWARD STOLESEN
BY Leon F. Herbert
ATTORNEY Feb. 15, 1966 T. STOLESEN ET AL 3,234,978
APPARATUS FOR TEXTURING BUILDING PANELS
Filed July 25, 1962 9 Sheets-Sheet 7

INVENTOR.
TRYGVE STOLESEN
ROLF STOLESEN
EDWARD STOLESEN
BY Leon F. Herbert
ATTORNEY Feb. 15, 1966    T. STOLESEN ET AL    3,234,978
APPARATUS FOR TEXTURING BUILDING PANELS
Filed July 25, 1962    9 Sheets-Sheet 8

INVENTORS
TRYGVE STOLESEN
ROLF STOLESEN
EDWARD STOLESEN
BY Leon F. Herbert
ATTORNEY

United States Patent Office 3,234,978
Patented Feb. 15, 1966

3,234,978
APPARATUS FOR TEXTURING
BUILDING PANELS
Trygve Stolesen, 771 S. Spring St., Ukiah, Calif.; Rolf
Stolesen, 525 Jackson Drive, Palo Alto, Calif.; and
Edward Stolesen, Rte. 1, Box 258, Lake Port, Calif.
Filed July 25, 1962, Ser. No. 212,333
12 Claims. (Cl. 144—136)

This invention relates to the field of large surface building panels such as 4 foot by 8 foot plywood panels. More specifically the invention relates to construction of such panels in a way that will increase their acceptance and usefulness in the building industry.

The high-strength, low-cost advantages of plywood panel construction have long been recognized. However, the smooth, unbroken appearance of such construction has materially limited the architectural acceptance of such construction. In order to increase the usefulness and acceptance of panel construction numerous modifications have been proposed to make a large panel replace the appearance of a plurality of separate solid boards butted together along their long edges and nailed to a supporting frame.

One previous attempt to solve the problem involves cutting straight parallel grooves spaced along the surface ply, normally with different distances between the grooves to give the appearance of random planking. This construction has met with considerable success but is of limited utility because the depth of the groove is necessarily limited in order not to overly weaken the panel. Thus, the planking effect is incomplete and is particularly unacceptable for exterior walls because the shallow depth of the grooves is almost imperceptible from a distance. In addition, the grain is obviously continuous over the entire face of the panel which departs from the desired appearance of separate planks. Further, the surface is smooth and therefore does not simulate the appearance of rough sawn boards, an appearance which is conventional for exterior walls and is becoming more and more prized for interior walls. The extensive use of rough sawn boards has become widely accepted because of the low cost of rough lumber relative to finished lumber and because of the natural beauty of rough lumber.

One attempt to overcome the weak planking effect of shallow grooves has been to nail narrow wood strips or battens over the plywood panel, particularly for exterior construction. However, the additional material and labor involved in this construction adds substantially to the cost of the structure, a complete house for example. Also, this approach does not solve the problem of smooth surfacing.

The continuous grain problem has been solved by a process which involves cutting the surface ply material into board width strips before the surface ply is glued to the under plys. The board width strips are scrambled and then edge glued to reform a surface ply of mixed grain. The reformed surface ply is then assembled with the under plys, and all the plys are glued together to form the panel. Finally, the surface ply is normally grooved along the joints between the board width strips. This approach is of course very expensive and does not solve the shallow groove and smooth surface problems.

An attempt has been made to solve the smooth surface problem by treating the surface ply with wire brushes in order to remove the softer wood so that the hardwood grain stands out in relief. This treatment creates a somewhat artificial rough appearance and of course merely emphasizes the continuous grain problem. Another attempt to solve the smooth surface problem has been to drag a straight bandsaw blade across the entire width of the surface ply. This treatment does not satisfactorily solve the continuous grain problem and creates the appearance of an unnaturally wide board rough cut on a band saw.

Another problem with plywood construction is that the surface ply is normally subject to considerable internal stress as a consequence of having been forced from the normally curved shape in which it is peeled from a log into the flat shape of a plywood panel. As a result the surface ply tends to check and crack after a period of time, particularly when exposed to the weather. This problem has been solved to some extent by the process of dragging a bandsaw blade over the surface because this cuts some of the fibers and thus relieves some of the internal stresses. Another problem caused by the usual smooth plywood surface is that of getting coating materials such as stains, oils and paints to adhere to and penetrate the smooth surface. This problem has also been solved to some extent by the processes of texturing with a bandsaw blade or wire brushing.

It is an object of this invention to provide apparatus for texturing large surface building panels which present solutions to all of the previously described problems.

More specifically an object of the invention is to provide apparatus for texturing a large surface building panel so that it will present the rough sawn texturing, not of a single unnaturally wide board, but of a plurality of normal width rough sawn planks butted together at their long edges.

An additional object of the invention is to provide apparatus for texturing a large surface panel so that the rough sawn texturing is formed by curved grooves arranged in such a way that the grooves which cause the rough sawn effect also create the impression of separate planks so that the definition of the plank joint lines is not solely dependent upon the depth of straight parallel grooves.

Another object of the invention is to provide apparatus for texturing a large surface panel so that the rough sawn texturing is formed by curved grooves arranged in such a way that they can also actually form the straight butt joint lines across the face of the panel.

A further object of the invention is to provide apparatus for texturing a large surface panel so that the rough sawn texturing is arranged in such a way that this texturing also substantially reduces the impression that a single grain pattern prevails throughout the surface.

An additional object of the invention is to provide apparatus for texturing a large surface plywood panel so that the rough sawn texturing is arranged in such a way that this texturing also stress relieves the surface ply in an improved manner and prepares the surface for improved reception and retention of stains, oils and paints.

Another object of the invention is to provide apparatus for texturing a large surface panel so that the rough sawn texturing is formed by curved grooves arranged in such a way that the surface of the panel containing the curved grooves is of non-uniform elevation.

By way of brief description these and other objects of the invention are achieved by indenting or cutting the face of the panel with a plurality of rows of curved grooves. Each row of curved grooves extends along the surface from one end to the opposite end, and straight parallel demarkation lines extend between said ends and separate each row of curved grooves from the adjacent row, all in a manner which will be apparent from the following detailed description which makes reference to the accompanying drawings.

Figure 1:
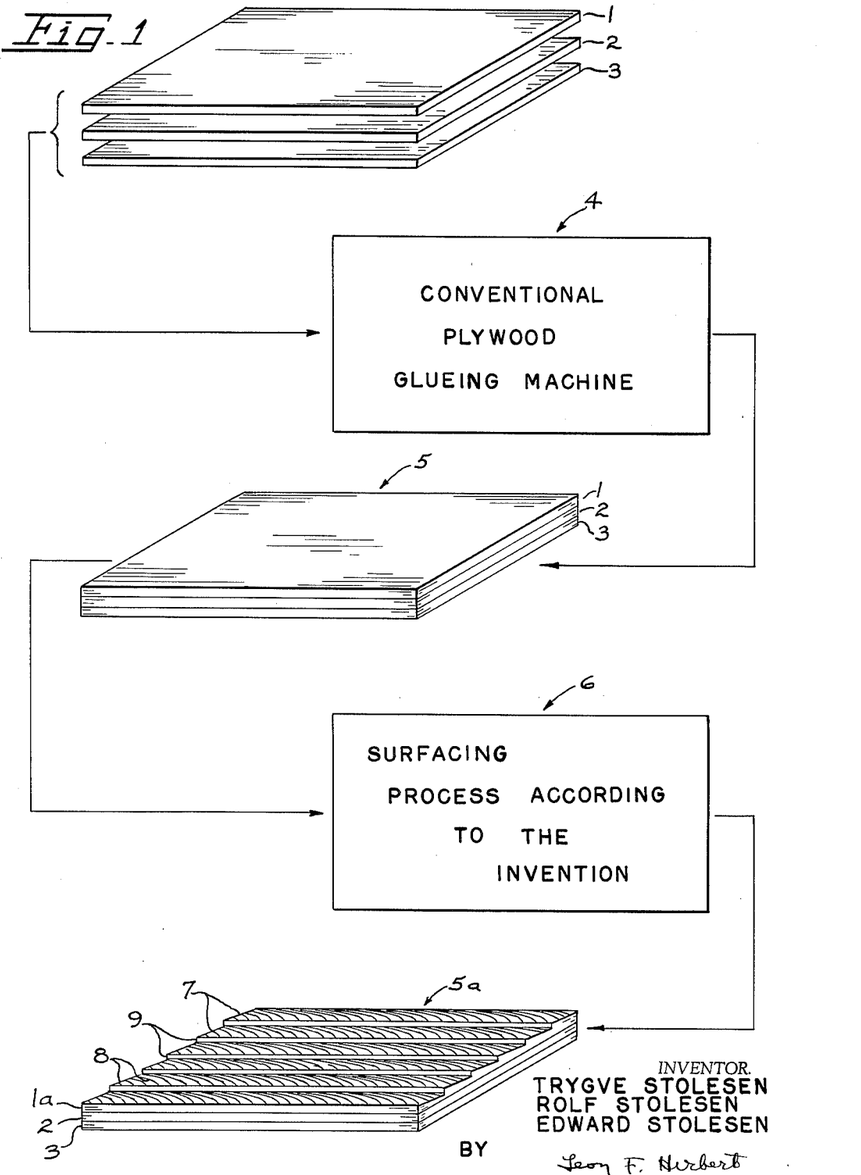
FIGURE 1 is a flow diagram showing the steps involved in preparing a plywood panel according to the invention.
Figures 8, 9:
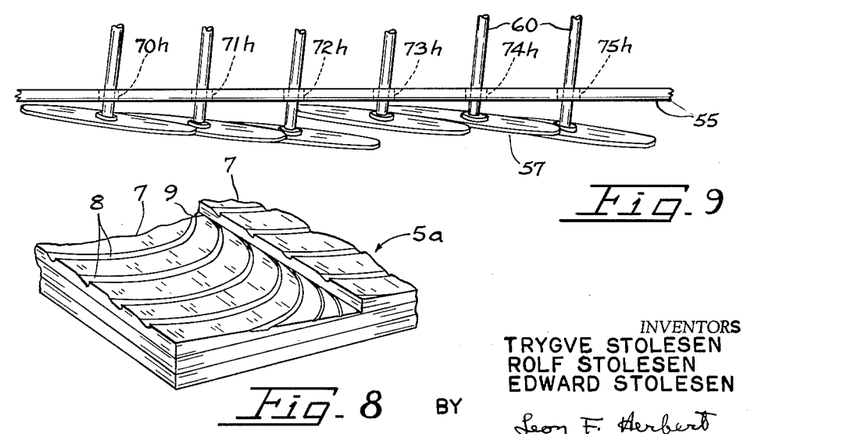
FIGURE 8 is an enlarged perspective view of a portion of the finished panel of FIGURE 1.
FIGURE 9 is a front view similar to FIGURE 5 but on enlarged scale, with most parts removed and showing a different depth adjustment of the cutters.

Referring in more detail to the drawings FIGURE 1 discloses a flow diagram for the process of this invention starting with separate plywood sheets 1, 2 and 3 of a conventional three-ply panel. The separate sheets travel through the usual glueing machine 4 where they are glued together, usually with the application of heat and pressure, and emerge as a unified plywood panel 5. Next the panel passes through the surfacing process 6 which will be later described in detail and emerges as a completed panel 5a having the features intended by the invention. The surfacing process provides the face of surface ply 1a with a plurality of rows 7 of curved groove lines 8 separated by straight groove lines 9, and preferably the straight groove lines 9 are emphasized by a difference in surface elevation at the junctions of adjacent rows. FIGURE 8 shows a close-up enlargement of a portion of panel 5a to impart a better understanding of the nature of the line-forming grooves. The curved groove lines 8 effectively roughen the surface to eliminate the smooth surface problem and to present a good surface for finishing with oils, stains, or paints. In addition, the curved grooves do an excellent job of stress relieving the face ply 1a because they cover a variety of directions and thus cut across the stress-carrying fibers regardless of how the grain may run. Further, the arrangement of grooves 8 into separate rows 7 catches the eye to overpower the normally present appearance of a continuous grain pattern. Still further, the non-continuous or row type arrangement of grooves 8 in and of itself contributes to the impression of separate planks butted together along their long edges so that this impression is not solely dependent upon the depth of any groove arrangement which is employed to form the straight lines 9. Also the curved grooves 8 in each row run out tangentially at one of the lines 9 so that grooves 8 themselves can actually form the straight lines 9 even if a difference in surface elevation at lines 9 is not employed.

Figure 2:
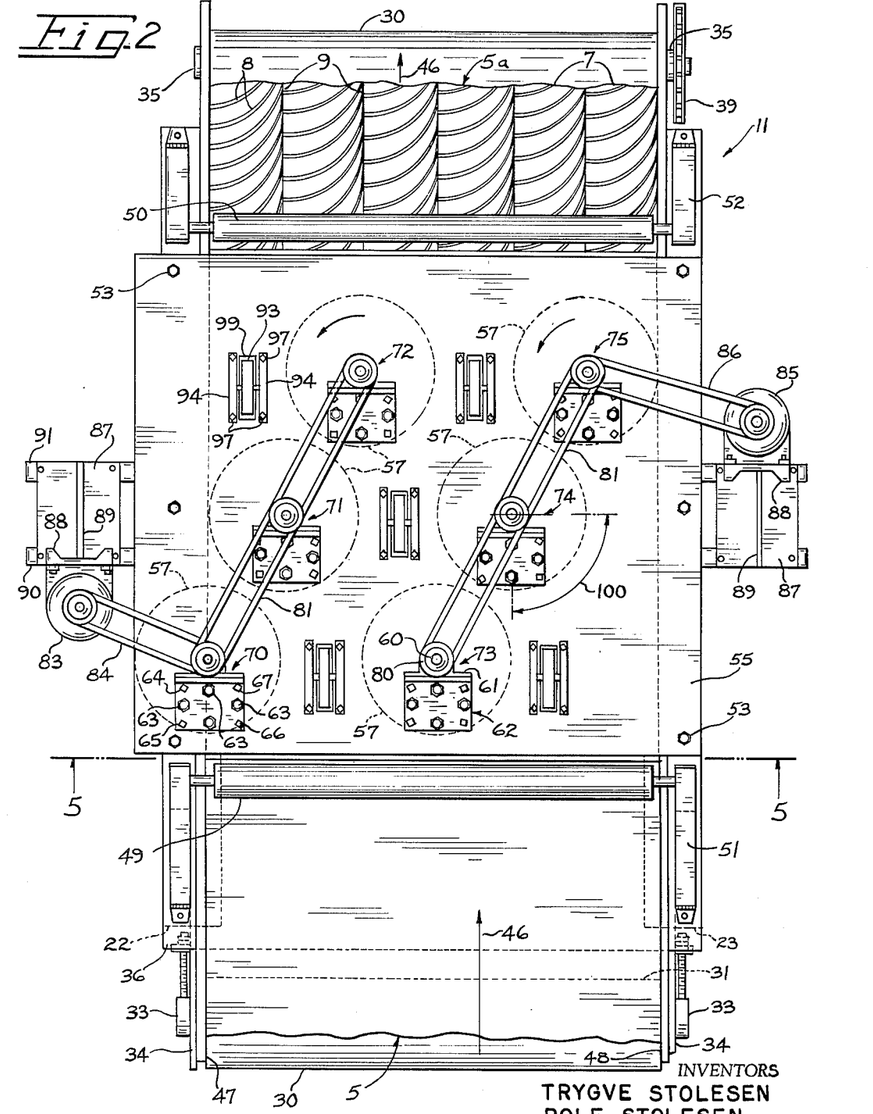
FIGURE 2 is a top view of a machine according to the invention for surfacing panels and showing a top view of a section of a finished panel emerging therefrom.
Figure 3:
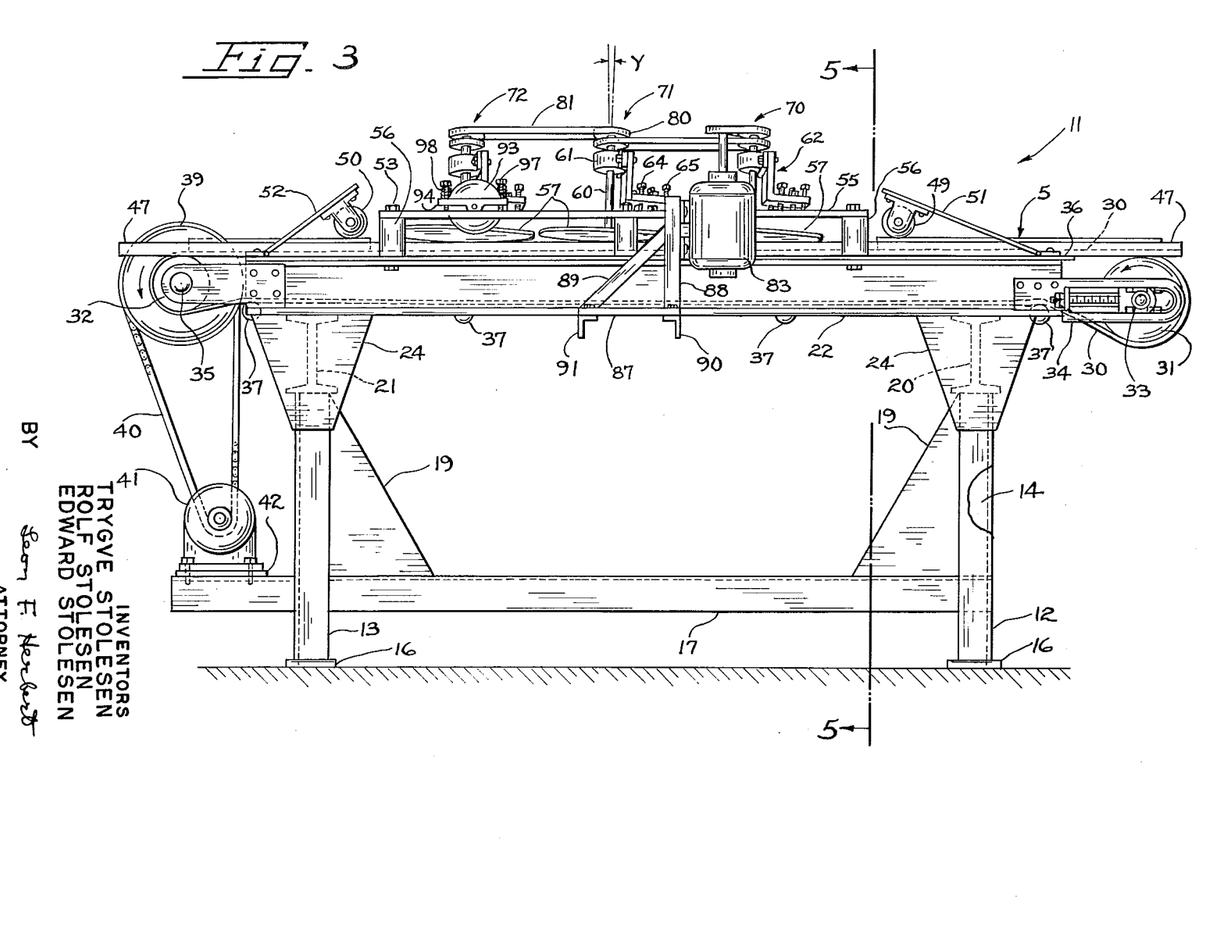
FIGURE 3 is a side elevational view of the machine taken on the left side of FIGURE 2.
Figures 5, 6:
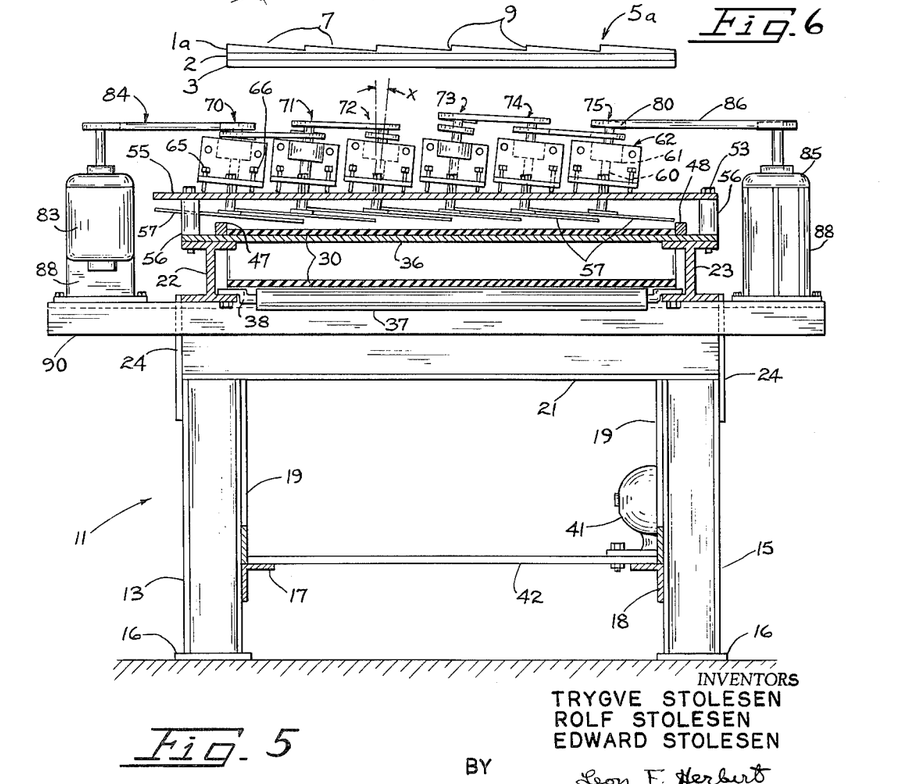
FIGURE 5 is a section looking front to rear of the machine along lines 5—5 in FIGURES 2 and 3.
FIGURE 6 is an end view of a plywood panel after passing through the machine when set up as shown in FIGURES 2, 3 and 5.

FIGURES 2, 3 and 5 show substantially full views of an effective type of surfacing machine 11 for providing the desired surfacing process. The machine comprises four channel iron legs 12, 13, 14 and 15 each mounted on a plate 16. Angle iron runners 17 and 18 extend between the legs and are welded to the inner surface of the legs. A reinforcing gusset 19 is welded to each of the legs and the adjacent portions of the runners. A pair of transverse I-beams 20 and 21 are welded or bolted across the tops of the legs, and a pair of longitudinal I-beams 22 and 23 are bolted or welded to the top of the transverse I-beams. Gusset plates 24 are welded to the legs and both pairs of I-beams to reinforce the structure.

An endless belt 30 is mounted on rollers 31 and 32. Roller 31 is journaled in conventional adjustable bearings 33 mounted on tracks 34 which are bolted to the longitudinal I-beams 22 and 23. Roller 32 is journaled in fixed bearings 35 bolted to the longitudinal I-beams. The top length of belt 30 travels over and is supported by a rigid sheet metal plate 36 which is mounted on the tops of the longitudinal I-beams 22 and 23. The bottom length of belt 30 is supported by four rollers 37 attached to I-beams 22 and 23 by pinion mounts 38. Roller 32 is the drive roller and is fitted with a chain gear 39 which is connected by a chain 40 to a drive motor 41. The motor is bolted to a transverse plate 42 supported on the runners 17 and 18.

The belt 30 serves to drive a plywood or other type of single surface building panel 5 through the machine along a straight line in the direction of the arrows 46 as shown in FIGURE 2. Guide rails 47 and 48 are mounted on the belt-supporting plate 36 to insure the desired straight line travel. The guide rails are spaced apart a distance about equal to the width of the panel to be processed, which in the normal case is four feet. In addition, heavy hold-down rollers 49 and 50 are employed at the front and back of the machine, respectively, to press the panel against the belt. Hinge plates 51 and 52, respectively, mount the rollers on the plate 36.

Figure 4:
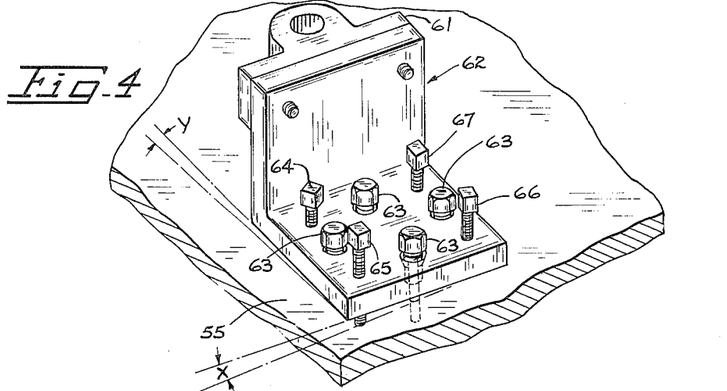
FIGURE 4 is a perspective view showing one of the cutter adjusting mechanisms of the machine on enlarged scale.
Figure 7:
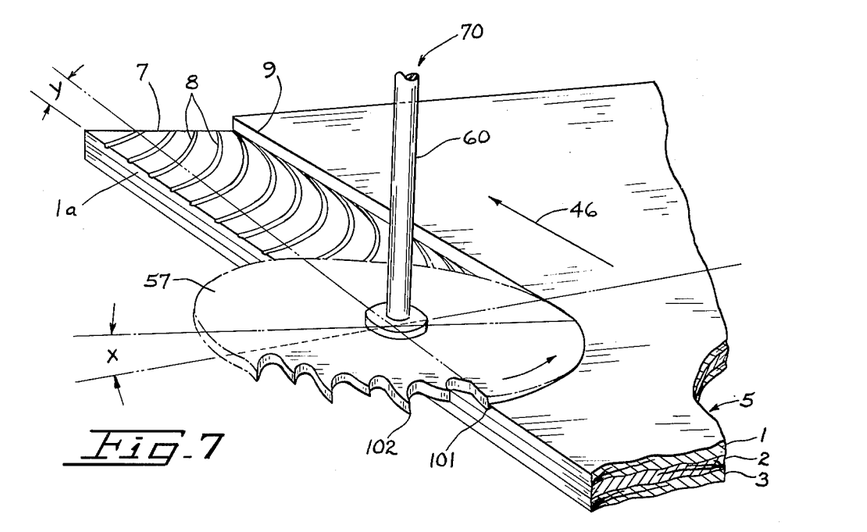
FIGURE 7 is an enlarged perspective view showing one of the cutters of the machine operating on a portion of a panel, with other parts removed.

The surface treating mechanism of the machine is mounted above the top length of belt 30 and comprises a cutter-mounting plate 55 which is supported on spaced mounting blocks 56 bolted in place on the top of the belt supporting plate 36. The bolts for this purpose are designated 53. The purpose of the plate 55 is to support a plurality of cutters 57. In the examples shown, the cutters are in the form of six circular saw blades, each having peripheral cutting teeth. Since the scale required to show the full machine is too small to include a detailed showing of the separate teeth, the cutters are shown in outline in all figures except the enlarged FIGURE 7. It is to be understood that the cutters in all figures include teeth as shown in FIGURE 7. In order to provide a number of adjustments contemplated by the invention, the cutters are mounted in a manner which permits the following types of cutter adjustment: angle X in the plane transverse to the line of travel 46 of the panel (FIGURES 4, 5 and 7); angle Y in the plane along the line of travel 46 of the panel (FIGURES 3, 4 and 7); elevation of the cutters above the top length of belt 30; position of cutters on plate 55; speed and direction of rotation of the cutters; diameter of circle of rotation of the teeth on the cutters; and others, all of which will be hereinafter explained in detail.

More specifically, the cutters 57 are each mounted on a shaft 60 journaled in a bearing block 61 on an L-shaped bearing bracket 62. In connection with the X and Y angles it should be understood that the angles requiring definition are the angles between the cutters and the face of the panel being surfaced, but the angles are more effectively designated in some of the figures in relation to the cutter shafts 60. However, since the cutters are mounted on the shafts normal thereto, it will be understood that definition of the shaft angle relative to vertical also defines the cutter angle relative to the horizontal panel. Each of the bearing brackets is attached to mounting plate 55 by means of four hold-down bolts 63 (shown best in FIGURE 4) threaded into plate 55 and four stand-off bolts 64–67 which are threaded in bracket 62 and abut the surface of plate 55. The hold-down bolts 63 are received in oversized holes in the brackets in order to accommodate variations in the X and Y angles. For purposes of identification, the cutter and support bracket structures are given station numbers 70–75 indicating their position on mounting plate 55.

It is belived obvious to those skilled in the art that the disclosed mounting arrangement provides one convenient means for adjusting the elevation of the cutters above the belt 30 and for adjusting the X and Y angles. For example, by referring to FIGURES 2, 4, 5 and 7 it will be seen that the X angle can be increased by screwing down the two stand-off bolts 64 and 65 and/or screwing up the two stand-off bolts 66 and 67. Similarly, in FIGURES 2, 3, 4 and 7 it will be seen that the Y angle can be increased by screwing down the two stand-off bolts 64 and 67 and/or screwing up the two stand-off bolts 65 and 66. The elevation of the cutters is adjusted by screwing all of the stand-off bolts up or down. Obviously, the hold-down bolts 63 must be loosened during any change in setting and then tightened down to hold the bracket 62 in any setting fixed by the positions of the stand-off bolts.

One way of mounting the cutters 57 and support brackets 62 is to unbolt and remove plate 55, attach the brackets 62 with shafts 60 projecting through plate 55, attach the cutters to the projecting shafts, and then remount the plate 55. Plate 55 is of course provided with a hole 70h–75h for each of the stations 70–75 as shown in FIGURE 9. The holes 70h–75h are of course oversized for the shafts 60 in order to accommodate the various X and Y angles.

In order to cause cutters 57 to rotate, each of the shafts 60 is provided at the top with a double pulley wheel 80, with the pulleys being interconnected by belts 81. Driving means for the cutters are provided in the form of a motor 83 which is connected to station 70 by a belt 84 and a motor 85 which is connected to station 75 by a belt 86. The motors are conveniently mounted on support frames comprising flat plates 87, vertical plates 88 and connecting bars 89. The support frames are bolted on two angle irons 90 and 91 attached to the undersurfaces of I-beams 22 and 23. In order to insure that a panel traveling on belt 30 under the plate 55 will remain at constant elevation under the cutters 57, a plurality of hold-down wheels 93 are mounted on plate 55 as shown in FIGURE 2 and at the left end of the plate 55 in FIGURE 3. Each of the wheels 93 is mounted on two support bars 94 which are attached to plate 55 by bolts 97 and biased downwardly by springs 98. Slots 99 are cut in the plate 55 to receive the wheels 93.

Operation of the machine as thus far described will now be discussed in detail. Motors 41, 83 and 85 are turned on, and unsurfaced panels 5 are fed along the path 46 and into the machine under roller 49 as shown in FIGURES 2 and 3. Belt 30 carries the panel through the machine in engagement with cutters 57, and the panel emerges from the machine under the roller 50 with a desired surface condition such as shown in FIGURES 1, 2, 7 and 8. In order to convey a clear conception of the operation of the cutters 57 on a panel, enlarged FIGURE 7 shows a perspective view of the cutter at station 70 operating on a panel 5 with all extraneous parts removed. It will be understood that the teeth shown by way of example on the cutter in FIGURE 7 extend around the entire periphery of the cutter. It should also be understood that although the invention is described and shown with particular reference to plywood panels many features of the invention are also applicable to other types of large surface building panels. As will be apparent from reference to FIGURES 2, 3, 5 and 7 the combined tilts in the X and Y planes cause the teeth on cutters 57 to enegage the panel throughout only about one quarter of the rotation of the cutter. More specifically, the X-angle tilt lifts the left portion of the blade out of engagement with the panel, and the Y-angle tilt lifts the rear portion of the blade out of engagement with the panel. Thus, as shown in FIGURE 2, for station 74 by way of example, the teeth on cutters 57 engage the panel through only the quarter rotation shown by the arc 100. Therefore, if the tooth diameter of cutters 57 are all sixteen inches, each cutter will cut a row 7 which is eight inches wide so that the six rows will cover the entire four foot width of the panel. The cutter at station 70 cuts to the left edge of the panel; the cutter at station 75 cuts to the right edge of the panel; and the cutters at the remaining stations cut the intermediate rows left to right in the same order as the numerical numbering of the stations.

The amount of tilt is variable within limits, and a variation of from 1° to 9° for both the X and Y angles has been found to fit most situations. When it is desired to make grooves 8 of the type shown in FIGURES 1, 2, 7 and 8, the X angle must exist but it need only be sufficient to raise the left half of the blade out of contact with the panel while the front of the right half is in contact. Similarly, the Y angle must exist but it need be only sufficient to raise the rear half of the blade out of contact with the panel while the front of the right half is in contact. It will be understood by those skilled in the art that each of the spaced teeth on the cutters cuts a separate groove 8. Thus in FIGURE 7, assuming rotation of cutter 57 in the direction of the curved arrow, the downward tooth 101 has just started a groove, but by the time the next downward tooth 102 meets the panel, the panel will have moved forward so that tooth 102 will start another groove.

The arrangement thus far described causes the teeth to cut curved grooves 8 which are approximately one quarter circles and clearly less than half circles. Obviously, half circle grooves can be cut if desired simply by making the Y angle zero. However, the half circle is not preferred because when separate planks are rough cut on a circular saw, the resulting grooves are normally less than half circles. Similarly, full circles can be cut simply by making both the X and Y angles zero, in which case the cutter at stations 70, 72 and 74 would be removed. However, full circle grooves are not preferred because when separate planks are rough cut on a circular saw, the resulting grooves are always substantially less than full circles.

It is important to note that not only do the cutters 57 cut separate curved grooves but they also cut the continuous straight lines 9 because at the right side of cutters 57 in FIGURES 2 and 7 the teeth are moving parallel to the line of travel of the panel, instead of normal thereto as when they meet the edge of the panel. Thus, the same grooves 8 which form the several curved rows 7 also contribute to formation of the straight separation lines 9 between the several rows. It should also be noted that the straight separation lines are emphasized by the fact that the elevation of the surface varies at these lines as shown in FIGURE 7 and caused by the X-angle tilt. One important feature is that the X-angle tilt makes it possible to obtain the benefit of elevational differences in a non-cumulative manner across the width of the panel so that a minimum amount of the surface ply is removed. The feature of non-cumulative elevational difference is shown in FIGURE 6, and the benefit of this feature is apparent from a comparison of FIGURES 6 and 27, the latter figure incorporating a cumulative type elevational difference as will be later described in detail.

The machine as shown in FIGURES 2, 3, and 5 results in a finished panel 5a (FIGURES 1, 2, 7 and 8) which has the appearance of 6 planks rough cut on a circular saw and butted together along their long edges. The eye catching lines formed by grooves 8 tend to distract the viewer from noticing any overall grain pattern, which pattern is the identifying characteristic of the usual plywood panel. In addition grooves 8 stress relieve the surface ply in an improved manner because they cut the fibers in a variety of directions rather than along a straight line as in the prior bandsaw treatment. Further, the grooves 8 prepare the surface for improved application and retention of stains, oils, and paints.

Figure 10:
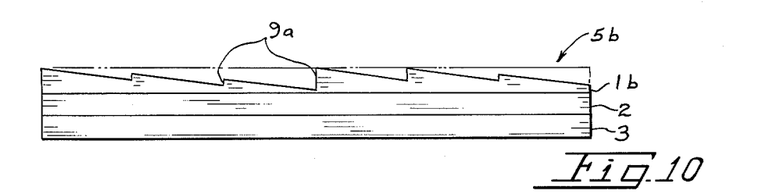
FIGURE 10 is an end view of a plywood panel after passing through the machine with the cutters adjusted as shown in FIGURE 9, and showing the original outline of the top ply in dot-dash lines.

In addition to the set up of the machine as shown in FIGURES 2, 3 and 5, a wide variety of adjustments are provided to obtain finished panels having a more random effect. For example, as shown in FIGURE 9 the depths of the several cutters can be varied to provide a panel 5b in which the lines 9a are at different elevations as shown in FIGURE 10. It will be understood that the thickness of the panel is exaggerated in the various end views such as FIGURE 10 in order to show more clearly the elevational difference at the straight lines such as 9a, and for the same reason, the outline of the unfinished panel is shown by dot dash lines in FIGURE 10.

Figure 11:
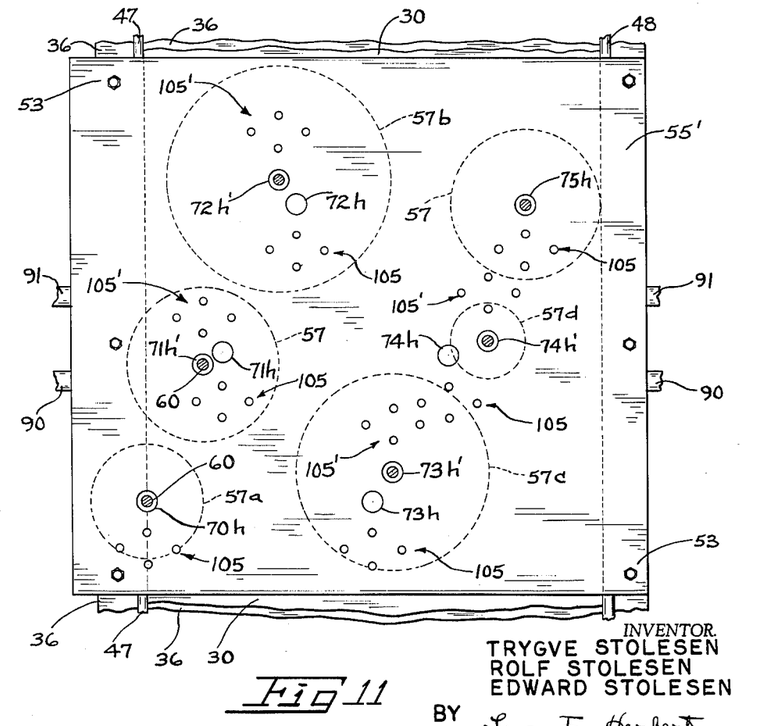
FIGURE 11 is a top view of the center portion of FIGURE 2 but showing a slightly modified cutter supporting plate with the cutter mounting members removed, and showing random diameter cutters.
Figure 12:
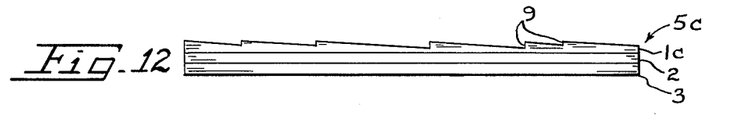
FIGURES 12 and 13 are end and top views, respectively, of a plywood panel after passing through the machine with the cutters shown in FIGURE 11.
Figure 13:
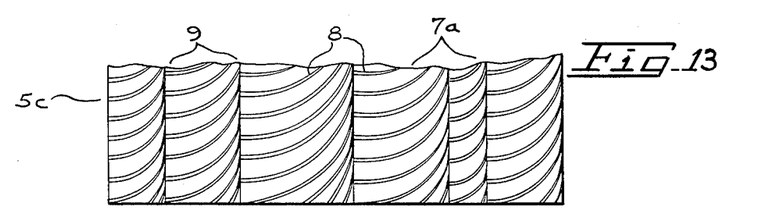

Another type of adjustment is shown in FIGURES 11–13 which disclose a random width planking effect. The machine is normally constructed to handle a conventional four foot wide panel between guides 47 and 48. Thus, as previously described the cutters in FIGURE 2 are each sixteen inches in diameter so that when each cuts an eight inch path the entire width of the panel will be surfaced. FIGURE 11 is a top view of the machine employing a slightly modified cutter supporting plate 55', with the support brackets 62 removed and the remainder of the machine cut away. The cutter supporting plate 55' is designed to accommodate either the uniform diameter cutters as in FIGURE 2 or the random width cutters of FIGURE 11. Accordingly, FIGURE 11 shows the shaft holes 70h–75h at the FIGURE 2 positions of stations 70–75 together with an array of holes 105 for the hold down bolts 63 in the positions of FIGURE 2. In addition the plate 55' in FIGURE 11 is drilled to provide shaft holes for the random diameter cutters.

For example, a twelve inch diameter cutter 57a is mounted through the original hole 70h; a sixteen inch diameter cutter 57 is mounted through hole 71h'; a twenty-four inch diameter cutter 57b is mounted through hole 72h'; a twenty inch diameter cutter 57c is mounted through hole 73h'; an eight inch diameter cutter 57d is mounted through hole 74h'; and a sixteen inch cutter 57 is mounted in the original hole 75h. This arrangement of cutter diameters and positions results in the finished panel 5c shown in FIGURES 12 and 13 in which the surface ply 1c has a plurality of random width rows 7a. The curved grooves 8 are the same in each row except for the difference in length as a result of being cut by different diameter cutters. The rows 7a have the following order of random widths: starting from the left in FIGURE 13 the widths of the rows are six inches, eight inches, twelve inches, ten inches, four inches, and eight inches. As is apparent from FIGURE 12, the X-angle tilt is the same for all the cutters in FIGURE 11. If it were desired to make the depth of all lines 9 the same, then the smaller diameter cutters would be adjusted to have a slightly greater X-angle tilt that the larger diameter cutters. Since plate 55' is provided with multiple shaft holes for adjustment between constant and random diameter cutters, the array 105' of threaded holes for bolts 63 is moved 180° from the original arrays 105 where necessary to avoid conflict with the original array. Obviously, this does not interfere with obtaining variation in the X- and Y-angle tilts. In addition the random diameter cutter positions will require the use of various length pulley belts. Also, if hold down wheels are used in connection with plate 55'; some must be arranged for alternative placement depending upon whether uniform or random diameter cutters are used.

Another desired random effect involves the spacing between the curved grooves 8. Thus, some of the rows 7 of grooves can have closely spaced grooves and other of the rows can have more widely spaced grooves. This difference can be accomplished in several ways. One way, which will be understood by those skilled in the art, is to vary the spacing between the cutting teeth such as teeth 101 and 102 on the cutter as shown in FIGURE 7. Thus, if teeth 101 and 102 were more or less widely spaced on some of the cutters, the grooves 8 will similarly be more or less widely spaced. Another way of accomplishing the same result but without changing cutters is to vary the rotational speed of the cutters, while maintaining uniform teeth spacing.

Figure 14:
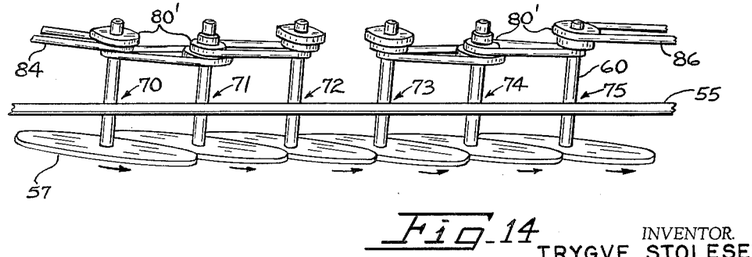
FIGURE 14 is a front view similar to FIGURE 9 but showing a pulley arrangement for causing the cutters to rotate at random speeds.
Figure 15:
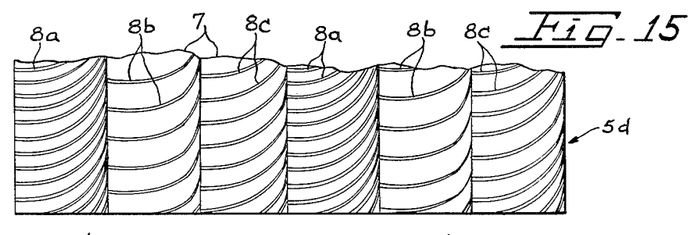
FIGURE 15 is a top view of a panel after passing through the machine with the cutters' speeds varied as shown in FIGURE 14.

The variation in speed can be conveniently accomplished by replacing the uniform diameter pulley wheels 80 with tapered pulley wheels 80' as shown in FIGURE 14. More specifically FIGURE 14 shows the machine exactly as set up in FIGURE 5 except for the difference in pulley wheels. This difference causes the cutter at station 70 to rotate fast, station 71 slow, station 72 medium, station 73 fast, station 74 slow, and station 75 medium. As shown in FIGURE 15 the different cutter speeds provide a surfaced panel 5d in which different ones of the rows 7 have differently spaced grooves 8a, 8b and 8c. The different rotational speeds not only change the spacing between the grooves but also change the shape. More specifically, a given tooth on a fast cutter as at station 70 moves further in the direction of travel of the panel in a given instant of time than does a given tooth on a slow cutter as at station 71. Accordingly, each fast-cut groove 8a extends from start to finish a greater distance along the length of the panel in a sharp curve, whereas each slow cut groove 8b extends a lesser distance along the panel and forms a flatter curve.

Figure 16:
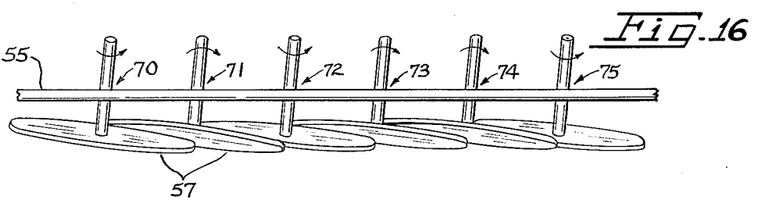
FIGURE 16 is a front view similar to FIGURE 9 but showing the cutters tilted in opposite directions along the line of travel of the panel.
Figure 17:
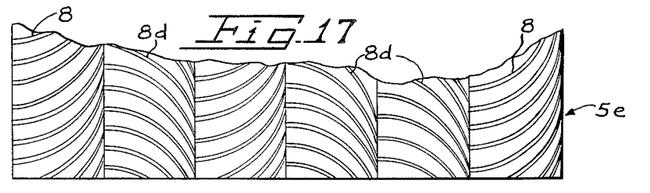
FIGURE 17 is a top view of a panel after passing through the machine with the cutter tilts varied as shown in FIGURE 16.

Another variation is shown in FIGURES 16 and 17. FIGURE 16 shows the machine set up exactly as in FIGURE 5 except that the Y-angle tilt is in opposite directions for alternate cutters. Thus, the cutters at stations 70, 72 and 75 are tilted forward as in FIGURE 5, and the cutters at stations 71, 73 and 74 are tilted backward. FIGURE 17 shows the top of the panel 5e cut by the machine adjusted as in FIGURE 16 and showing the reverse sloping grooves 8d cut at stations 71, 73 and 74. In FIGURE 16 the cutters 57 are all rotating in the same direction and therefore the grooves 8 and 8d have substantially the same shape even though they curve in opposite directions. The reason is that all the cutters are traveling in the same direction at their right edges where the teeth are moving with an appreciable component of travel parallel to the path of the panel.

Figures 18, 19, 20, 21:
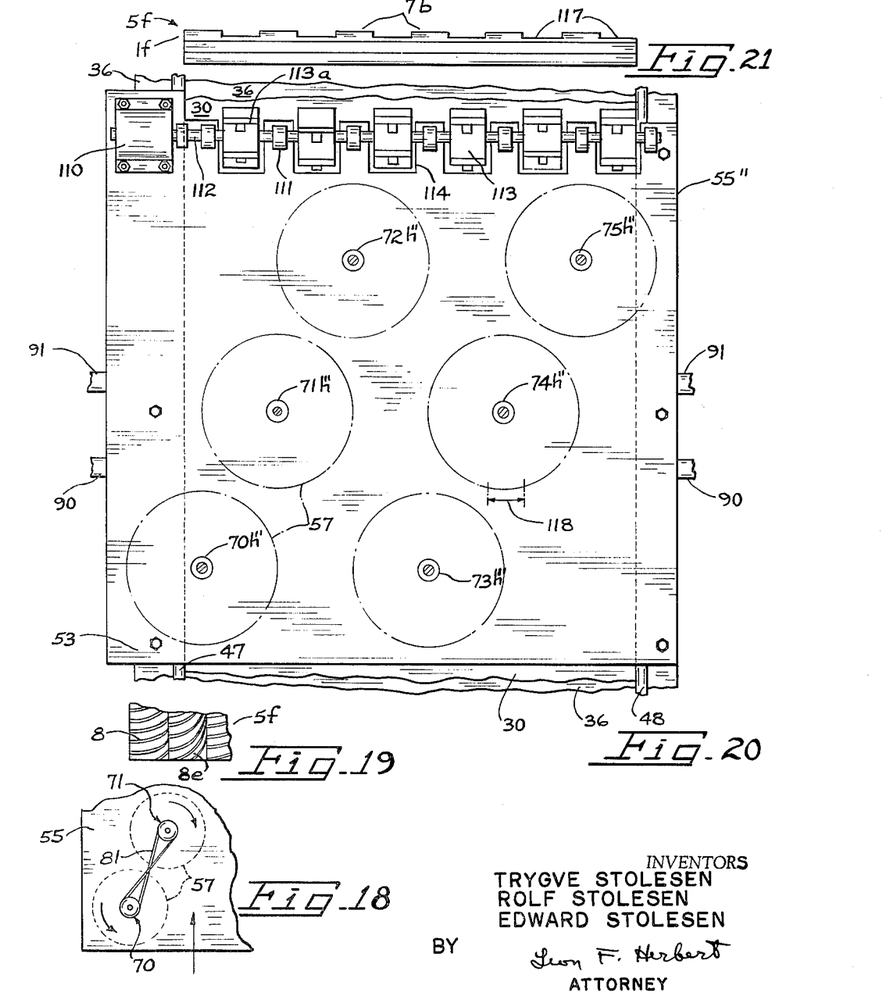
FIGURE 18 is a partial view similar to FIGURE 11 on reduced scale and showing the cutters connected to rotate in opposite directions.
FIGURE 19 is a top view of a portion of a panel after passing through the oppositely rotating cutters of FIGURE 18.
FIGURE 20 is a top view of a slightly modified cutter supporting plate including vertical grooving means and different positioning of the cutters.
FIGURES 21 and 22 are end and top views, respectively, of a panel after passing through the machine as set up in FIGURE 20.

As shown in FIGURES 18 and 19 yet another variation can be obtained by reversing the direction of rotation of the cutters 57. FIGURE 18 is a top view of a portion of the plate 55 of FIGURE 2 on reduced scale and showing belt 81 twisted to cause the cutters at stations 70 and 71 to rotate in opposite directions. FIGURE 19 shows a top view of a portion of a panel 5f cut on the machine as set up in FIGURE 18. It will be noted that each groove 8 resulting from counter-clockwise rotation at station 70 does not extend as far along the length of the panel as does each groove 8e resulting from clockwise rotation at station 71. The reason is that at the right edges of the cutters the teeth at station 70 are moving in the same direction as the panel, and the teeth at station 71 are moving in the opposite direction. Therefore at station 70 the movement of teeth and panel tend to cancel each other and the teeth engage a relatively shorter length of board. At station 71 the movement of teeth and panel are additive and the teeth engage a relatively longer length of panel.

It should be understood that the magnitude of the variations in groove shape caused by changing speed or direction of rotation of the cutters is a function of the relation between cutter speed and panel speed. More specifically, the faster the cutters rotate in relation to the speed of the panel, the less detectable will be the difference in groove shape caused by change in cutter speed or direction of rotation. It should also be understood that while the use of circular cutters facing the panel is the preferred way of cutting the desired curved grooves, any structure can be used which moves a cutting tooth over the panel with a component of travel transverse to the path of travel of the panel so that the combined motions of tooth and panel will cause the tooth to scribe a curved line across the panel. Similarly, it should be understood that the desired result could be achieved if the panel remained stationary and cutters such as cutters 57 were made to travel along the length of the panel as well as made to rotate. Also, it should be understood that different shaped teeth can be used to give different cross sectional shapes to the curved grooves.

Figure 22:
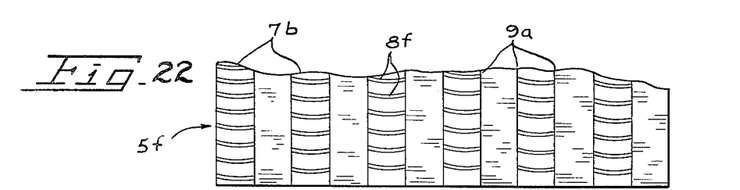

FIGURES 20-22 show another arrangement of the machine embodying a modified cutter supporting plate 55″. Plate 55″ is the same as plate 55 except that the rearward end of the plate is modified to support a motor 110 and bearings 111. A shaft 112 in the bearings is driven by the motor and carries six conventional grooving rotors 113 having blades 113a. The end of plate 55″ has slots 114 through which the rotors can pass and engage a panel on belt 30. In addition, the cutters 57 are oriented differently in relation to guides 47 and 48, as shown by the shaft holes 70h″-75h″. FIGURES 21 and 22 show a finished panel cut with the machine as arranged as in FIGURE 20. It will be noted that the rotors 113 cut vertical grooves 117. In the example shown, the grooves 117 are each four inches wide and the rows 7b are each four inches wide. In order to obtain the four inch cut from the sixteen inch cutters 57, they are given no X-angle tilt, and the Y-angle tilt is just sufficient to cause the teeth to engage the panel during the four inch travel at the front center of each cutter as shown by line 118 for the cutter received in hole 74″. Obviously a greater width of tooth engagement is acceptable because rotors 113 will remove any excess curved grooves. Also X-angle tilt can be employed if desired, but such tilt is not required to obtain elevational difference at lines 9a since that is provided by the grooving rotors 113.

Figure 23:
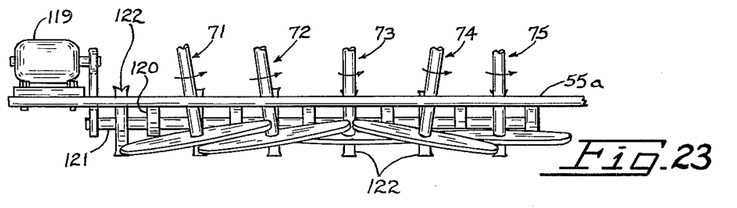
FIGURE 23 is a front view similar to FIGURE 16 but showing the cutters tilted at different angles in the plane transverse to the line of travel of the panel and including vertical grooving means.
Figure 24:
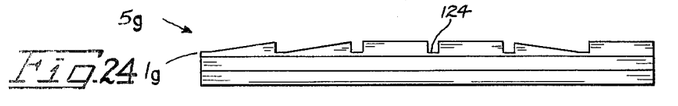
FIGURES 24 and 25 are end and top views, respectively, of a panel after passing through the machine as set up in FIGURE 23.
Figure 25:
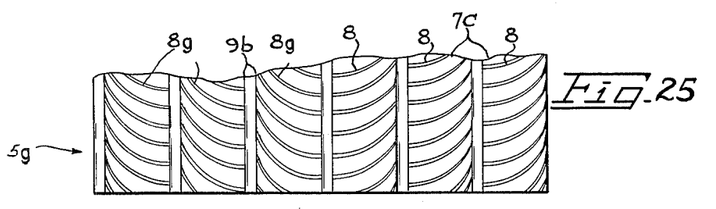

FIGURES 23-25 show a further variation employing vertical grooving rotors and random X-angle tilts. In this case the cutter at station 70 in FIGURES 2 and 5 is removed and the cutters at stations 71 and 72 are given an X-angle tilt to the left instead of to the right; the cutter at station 74 is tilted to the right; and the cutters at station 73 and 75 are given no X-angle tilt. All of the cutters are given Y-angle tilt as in the case of FIGURE 5. The cutter supporting plate 55a is similar to plate 55″ and supports a motor 119, bearings 120, shaft 121, and vertical grooving rotors 122. The reason why five instead of six cutters can cover the entire panel is that the cutter at station 74 is tilted to the right; and the cut-from right edge to left edge, with the center portion of the curved grooves being cut out by a groove 124 formed by one of the rotors 122. Grooves 8 and 8g are given different numbers because they have slightly different shapes due to the difference in direction of travel of the teeth on the side of the cutter which engages the panel. More specifically, at stations 71, 72 and 73 the cutting left edges of the cutters are moving against the direction of travel of the panel to provide additive travel of the teeth relative to the panel, whereas at stations 73, 74 and 75 the cutting right edges of the cutters are moving in the same direction as the panel to provide canceling travel of the teeth relative to the panel, in similar manner as explained for FIGURES 18 and 19. The reason why the cutter at 75 does not cut on its left side is that on its left side the panel is removed by the cutter at 74 and one of the rotors 122. All of the rotors 122 cut the panel to remove the curved groove lines so that the curved groove lines do not run out tangent to the edges of their rows, except for the extreme right row, as shown in the finished panel 5g in FIGURE 25.

Figure 26:
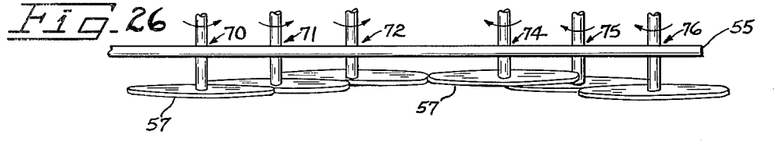
FIGURE 26 is a front view similar to FIGURE 23 but showing the cutters at different elevations and without any tilt in the plane transverse to the line of travel of the panel.
Figure 27:
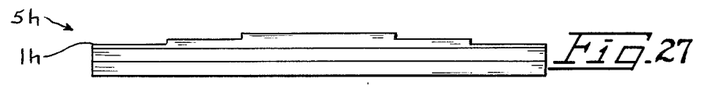
FIGURES 27 and 28 are end and top views, respectively, of a panel after passing through the machine as set up in FIGURE 26.
Figure 28:
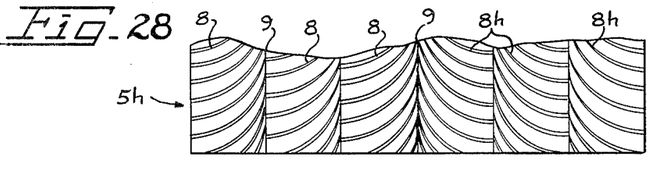

Another variation is shown in FIGURES 26-28 in which all of the cutters have only a Y-angle tilt and no X-angle tilt. The reason why the cutters cut only on one side is that they are at increasing elevations from both sides up to the middle. The cutters are arranged slightly differently than in FIGURES 2 and 5 in that the cutter at station 73 is moved to the right to a new station 76. Cutters 70, 71 and 72 rotate counter-clockwise and cut grooves 8 on their right sides. Cutters 74, 75 and 76 rotate clockwise and cut grooves 8h on their left sides. It will be noted that the straight line 9 at the center of FIGURE 28 is provided solely by the curved grooves because there is no difference in elevation at this point as shown in FIGURE 27. The direction of rotation of the cutters in FIGURE 26 could of course be varied as desired to give different patterns in FIGURE 28.

Although preferred embodiments of the present invention are shown and described herein, it is to be understood that modifications may be made therein without departing from the spirit and scope of the invention as set forth in the appended claims.

Having thus described the invention what is claimed as new and desired to be secured by Letters Patent is:

1. Panel texturing machine comprising panel holding structure for supporting a building panel in a flat plane, a plurality of cutters each having spaced grooving teeth, support means rotatably supporting said cutters adjacent said plane on the same side thereof, means for providing relative movement between a panel in said holding structure and said cutters along a line of travel, means for rotating said cutters whereby the teeth on each cutter rotate in a circle, said panel holding structure and cutter support means being so positioned relative to each other that the plane of rotation of the teeth on each cutter is tilted at an angle to said flat plane measured in a first plane normal to said line of travel and normal to said flat plane, each said plane of rotation being also tilted at an angle to said flat plane measured in a second plane normal to said first plane and normal to said flat plane, the axis of rotation of some of said cutters being offset from each other transversely of said line of travel, and the axis of rotation of some of said cutters being offset from each other along the direction of said line of travel.

2. Panel texturing machine as claimed in claim 1 in which said means for rotating said cutters includes means for rotating at least two of said cutters at different speeds relative to each other.

3. Panel texturing machine as claimed in claim 1 in which said means for rotating said cutters includes means for rotating at least two of said cutters in opposite directions relative to each other.

4. Panel texturing machine as claimed in claim 1 in which at least two of said cutters are positioned at different distances from said panel holding structure.

5. Panel texturing machine as claimed in claim 1 in which the planes of rotation of the teeth on at least two of said cutters are at different angles to the face of a panel in said holding structure measured in said first plane.

6. Panel texturing machine as claimed in claim 1 in which the diameter of the circle of rotation of the teeth on at least one of said cutters is different from the diameter of the circle of rotation of the teeth on at least one other of said cutters.

7. Panel texturing machine as claimed in claim 1 in which the planes of rotation of the teeth on at least two of said cutters are at opposite angles to the face of a panel in said holding structure measured in said second plane.

8. Panel texturing machine comprising panel holding structure and a plurality of cutters, said cutters each having spaced grooving teeth, support means rotatably supporting said cutters adjacent said panel holding structure on the same side thereof, means for providing relative movement between a panel in said holding structure and said cutters along a line of travel, means for rotating said cutters whereby the teeth on each cutter rotate in a circle, said cutters having their axes of rotation offset from each other transversely of said line of travel, said panel holding structure and cutter support means being so positioned relative to each other that the plane of rotation of the teeth on each cutter is tilted at an angle to the face of a panel in said holding structure measured in a first plane normal to said line of travel and normal to said panel face, and each said plane of rotation being also tilted at an angle to the face of a panel in said holding structure measured in a second plane normal to said first plane and normal to said panel face.

9. Panel texturing machine comprising panel holding structure and a plurality of cutters, said cutters each having spaced grooving teeth, support means rotatably supporting said cutters adjacent said panel holding structure on the same side thereof, means for providing relative movement between a panel in said holding structure and said cutters at a given rate along a line of travel, means for rotating said cutters at a given rate whereby the teeth on each cutter rotate in a circle, said cutters having their axes of rotation offset from each other and more near normal to a panel in said holding structure than parallel thereto, said panel holding structure and cutter support means being so positioned relative to each other that the plane of rotation of the teeth on each cutter is tilted at an angle to the face of a panel in said holding structure measured in a first plane normal to said line of travel and normal to said panel face, each said plane of rotation being also tilted at an angle to the face of a panel in said holding structure measured in a second plane normal to said first plane and normal to said panel face, and the spacing between said grooving teeth on each cutter being sufficiently large and said given rate of rotation being sufficiently slow relative to said given rate of travel that the projection of the relative motion of each grooving tooth perpendicularly onto a panel in said holding structure forms a curved line spaced from the curved line of each adjacent tooth.

10. Panel texturing machine comprising a support frame, belt rollers mounted adjacent opposite ends of said frame, a continuous belt encircling said rollers, means for rotating one of said rollers to drive the top length of the belt at a given rate of travel, means rotatably supporting a cutter shaft above the plane of said top length of the belt and substantially more near normal than parallel thereto, a cutter attached to said shaft and having separate grooving teeth thereon, means for rotating said shaft so that said teeth rotate in a circle at a given rate of rotation, the lowermost edge of the circle of rotation of said teeth being spaced above the plane of the top length of said belt, the spacing between said grooving teeth on said cutter being sufficiently large and said given rate of rotation being sufficiently slow relative to said given rate of travel of the belt that the projection of the motion of each grooving tooth perpendicularly onto a panel traveling with said belt forms a curved line spaced from the curved line of each adjacent tooth, the plane of rotation of the teeth on said cutter being tilted to said top length of the belt measured in a plane along the line of travel of said belt and normal to said top length of the belt, and said plane of rotation being also tilted at an angle to said top length of the belt measured in a plane normal to said line of travel of the belt and normal to said top length of the belt.

11. Panel texturing machine comprising means for supporting a building panel in a flat plane, a plurality of cutters each having grooving teeth spaced around a circle, means rotatably supporting said cutters adjacent said plane on the same side thereof, the axes of rotation of said cutters being substantially more normal than parallel to said flat plane, means for rotating each of said cutters at a given rate of rotation, means for providing relative movement between a panel in said supporting means and said cutters in a straight path along said flat plane at a given rate of travel, the spacing between said grooving teeth on each cutter being sufficiently large and said given rate of rotation being sufficiently slow relative to said given rate of travel that the projection of the motion of each grooving tooth perpendicularly onto a panel in said supporting means forms a curved line spaced from the curved line of each adjacent tooth, said cutters having their axes of rotation offset from each other transversely of said straight path, and said panel supporting means and said cutter supporting means being so positioned relative to each other that the plane of rotation of the teeth on each of said cutters is tilted to said flat plane measured in a plane along said straight path and normal to said flat plane.

12. Panel texturing machine comprising means for supporting a building panel in a flat plane, a plurality of cutters each having spaced grooving teeth, means rotatably supporting said cutters adjacent said flat plane on the same side thereof, means for rotating each of said cutters at a given rate of rotation whereby the teeth on each cutter rotate in a circle, means for providing relative movement between a panel in said supporting means and cutters in a straight path along said flat plane at a given rate of travel, the space between said grooving teeth on each cutter being sufficiently large and said given rate of rotation being sufficiently slow relative to said given rate of travel that the projection of the motion of each grooving tooth perpendicularly onto a panel in said supporting means forms a curved line spaced from the curved line of each adjacent tooth, said cutters having their axes of rotation offset from each other transversely of said straight path, said axes of rotation being substantially more near normal to said flat plane than parallel to said flat plane, said panel supporting means and said cutter supporting means being so positioned relative to each other that the plane of rotation of the teeth on each of said cutters is tilted to said flat plane measured in a plane normal to said straight path and normal to said flat plane, and the projection of said circles of rotation perpendicularly onto said flat plane forming projected circles in which the edge of each of a plurality of said projected circles extends transversely of said straight path far enough to be aligned in the direction of said straight path with the center of an adjacent projected circle.

References Cited by the Examiner
UNITED STATES PATENTS

| | | | |
|---|---|---|---|
| 1,623,020 | 3/1927 | Norris | 144—136 |
| 2,174,593 | 10/1939 | Pelot et al. | 144—176 |
| 2,480,536 | 8/1949 | Andrus | 143—49 |
| 2,555,382 | 6/1951 | Uschmann | 144—118 |
| 2,630,604 | 3/1953 | Marsh | 20—15 |
| 2,722,956 | 11/1955 | Ludwig | 144—118 |
| 2,812,790 | 11/1957 | Stuart | 144—323 |
| 2,818,895 | 1/1958 | Zuber | 144—118 |
| 2,847,721 | 8/1958 | Diamond | 20—15 |
| 2,870,806 | 1/1959 | Thompson | 144—136 |
| 2,907,359 | 10/1959 | Lade | 144—136 |
| 2,940,489 | 6/1960 | Feiner | 144—136 |
| 2,965,144 | 12/1960 | Loewenthal | 144—323 |
| 2,974,692 | 3/1961 | Bolenbach | 143—38 |

HAROLD D. WHITEHEAD, *Primary Examiner.*

JACOB L. NACKENOFF, WILLIAM W. DYER, Jr., LESTER M. SWINGLE, *Examiners.*

J. E. MURTAGH, *Assistant Examiner.*